(12) United States Patent
Berkley et al.

(10) Patent No.: US 6,351,843 B1
(45) Date of Patent: Feb. 26, 2002

(54) DYNAMICALLY INSERTING A FUNCTION INTO AN APPLICATION EXECUTABLE AT RUNTIME

(75) Inventors: Donald J. Berkley, New Paltz; Frank J. De Gilio, Poughkeepsie; Mark I. Dinges, Salt Point; Kevin R. Evans, Wappingers Falls; Theodore R. Maeurer, Poughkeepsie, all of NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/143,877

(22) Filed: Aug. 31, 1998

(51) Int. Cl.$^7$ ................................................. G06F 9/48
(52) U.S. Cl. ............................ 717/4; 709/332; 713/100
(58) Field of Search .............................. 709/310–332; 717/1–10; 713/1, 2, 100

(56) References Cited

U.S. PATENT DOCUMENTS

| | | | |
|---|---|---|---|
| 5,305,389 A | | 4/1994 | Palmer ........................ 382/305 |
| 5,339,430 A | * | 8/1994 | Lundin et al. ............... 709/332 |
| 5,339,438 A | * | 8/1994 | Conner et al. ................. 717/5 |
| 5,450,586 A | | 9/1995 | Kuzara et al. ................. 717/4 |
| 5,513,317 A | | 4/1996 | Borchardt et al. ............ 714/45 |
| 5,684,955 A | * | 11/1997 | Meyer et al. ............... 709/316 |
| 5,692,195 A | * | 11/1997 | Conner et al. .............. 709/316 |
| 5,940,616 A | * | 8/1999 | Wang ............................ 717/4 |
| 6,044,224 A | * | 6/2000 | Radia et al. .................. 717/10 |
| 6,083,277 A | * | 7/2000 | Fowlow et al. ................ 717/1 |
| 6,139,198 A | * | 8/2000 | Danforth et al. ............... 717/4 |

OTHER PUBLICATIONS

IBM Technical Disclosure Bulletin, "LAN Netview Fix—Object–Oriented Trace Facility", Dec, 1994, vol. 37 No. 12, pp. 51–52.

IBM Technical Disclosure Bulletin, "Visual Debugger for C++ Object–Oriented Programs", May 1994, vol. 37 No. 05, pp. 245–246.

C. Skelly, Powerful Pointers to Member Functions (New Pointer Types In C++), C/C++ Users Journal, n10, v12, Oct. 1994, 7 pp.

* cited by examiner

Primary Examiner—St. John Courtenay, III
(74) Attorney, Agent, or Firm—William A. Kinnaman, Jr., Esq.; Kevin P. Radigan, Esq.; Heslin Rothenberg Farley & Mesiti P.C.

(57) ABSTRACT

A technique is presented for dynamically inserting a function into an existing application executable of an object-oriented system at runtime of the executable and without requiring recompiling of the code. This is accomplished by modifying configuration settings of the executable at runtime to add a setting to specify the function for at least one class of the executable. The modified configuration settings are then used when running the executable and when a class is encountered for which the function is active, a redirection stub is dynamically inserted to implement the function for the methods of that class. In one embodiment, the function is a trace function and the redirection stub implements an entry trace and an exit trace about each target method of a class for which the trace function is active. Various CORBA implementations of the technique are possible.

28 Claims, 6 Drawing Sheets fig. 1 fig. 2 fig. 3 fig. 5 fig. 4 fig. 6 fig. 7 fig. 8

DYNAMICALLY INSERTING A FUNCTION INTO AN APPLICATION EXECUTABLE AT RUNTIME

TECHNICAL FIELD

This invention relates in general to addition of functions to code in object-oriented implementations, and more particularly, to a mechanism for dynamically inserting a function into an existing application executable of an object-oriented computer system at runtime.

BACKGROUND OF THE INVENTION

Computer software used to control ever increasingly complex processes itself continues to become increasingly complex. Many tools have been developed for assisting a software engineer in the development of such complex software. These tools include compilers, assemblers, linkers, editors and the like, as well as other specific specification and design tools, configuration management tools, language-smart editors and the like.

One of the primary tasks of the software engineer is to analyze application code to determine whether the code operates as desired and if an error is found, to initiate a debugging process. Traditional debugging methods include slow manual processes such as inserting print statements into the software at particular locations so that the values of variables and the like may be checked to determine if they have the expected values. However, such approaches are less than optimal because they result in very high overhead and intrusion on the operation of the code being examined.

As a further consideration, there are unique issues involved in debugging distributed object-oriented systems. The paradigmatic differences in the flow of object-oriented code necessitate alternative methods for debugging. Unlike its linear predecessor, the execution flow of object-oriented programs is less structured since each method call may call methods of a seemingly unrelated object. In traditional programming, the flow of control starts at the top and continues to the bottom unless there are subroutines that are called or loops that alter the flow of the program. The subroutines also follow the same execution rules. In object-oriented programs, the flow is not as obvious. Since the execution of a program is likely to involve many objects, and each object has a number of methods that are used to manipulate the object, it is difficult to determine the flow of control throughout the execution of the program.

Figure 1:
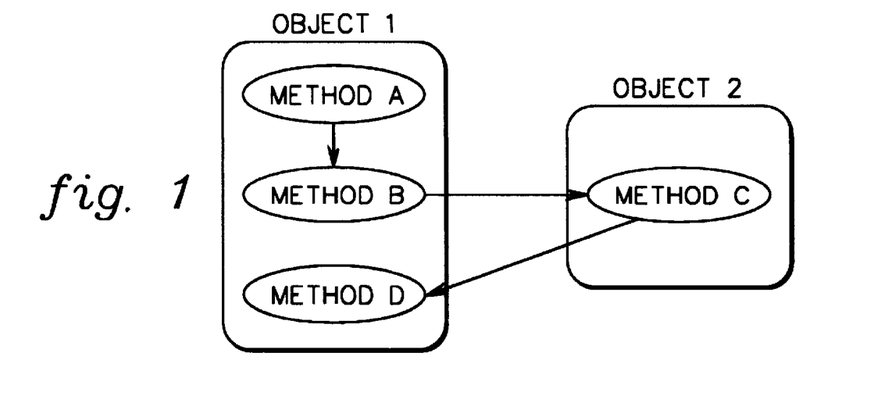
FIG. 1 is a diagram of multiple objects of an application executable useful in explaining problems addressed by the present invention.

Consider the object-oriented environment of FIG. 1. In the diagram, method A is responsible for modifying a value of object 1. Method A calls method B to determine the original value to be modified. Method B calls method C in object 2 to determine values in object 2 that will directly affect the value that method B will return. Method C then calls method D to determine a different value in object 1 that helps to define the relationship between the two objects. Armed with this data, method C can return the value to method B which in turn allows method A to modify the value. As more objects are combined, one can readily see that the call stack becomes increasingly important in debugging not only an error in the current method, but in the execution of all previous methods to determine the state an object was in when the current method was called.

Existing object-oriented tracing methods typically employ macro calls that must be physically added to the code by a programmer, this leaves much room for error and it also means that the method that is not physically modified will not be traced. Further, such macro calls, once inserted, are in the code and must be executed even if one is not interested in tracing. Even with a trace flag check, there will be millions of wasted instructions. Since every routine has the same two macros, tracing will only have an on/off quality which allows the user to turn tracing on for every method or off for every method.

In view of the above, a need exists in the art for a novel mechanism for dynamically inserting a function into an existing application executable of an object-oriented environment which does not require a user to modify the source code, does not require the code to be re-compiled with special options, and which allows a user to specify one or more methods for which the function is to be implemented, and minimizes instructions when the function is inactive.

DISCLOSURE OF THE INVENTION

Briefly summarized, the present invention comprises in one aspect a method for inserting a function into an existing application executable of an object-oriented computer system without recompiling the executable. The method includes: modifying runtime configuration settings to add a setting to specify the function for at least one class of the application executable; and running the application executable using the modified runtime configuration settings and if runtime determines that the function is active for a class of the executable using the modified runtime configuration settings, then dynamically creating a redirection stub to implement the function for the class.

In another aspect, the invention comprises an object-oriented computer system for inserting a function into an application executable without recompiling the application executable. The system includes means for modifying runtime configuration settings for the application executable to add a setting to specify the function for at least one class of the application executable. Further, the system includes means for running the application executable using the modified runtime configuration settings, wherein the means for running includes means for determining whether the function is active for a class of the executable using the modified configuration settings, and means for dynamically creating a redirection stub to insert the function for the class if the function is active for that class.

In still another aspect, an object-oriented computer system is provided for inserting a function into an application executable without recompiling the executable. The system includes a computing unit adapted to modify runtime configuration settings for the application executable to add a setting to specify the function for at least one class of the executable. The computing unit further is adapted to run the application executable using the modified runtime configuration settings and if runtime determines that the function is active for a class of the application executable using the modified configuration settings, then to dynamically create a redirection stub to implement the function for that class.

In a further aspect, an article of manufacture is provided which includes at least one computer usable medium having computer readable program code means embodied therein for causing inserting of a function into an application executable of an object-oriented computer system without recompiling the application executable. The computer readable program code means in the article of manufacture includes computer readable program code means for causing a computer to effect modifying runtime configuration settings to add a setting to specify the function for at least one class of the application executable; and computer readable program code means for causing a computer to effect running the application executable using the modified configuration settings and if runtime determines that the function is active for a class of the application executable, then dynamically creating a redirection stub to implement the function for that class.

To restate, a technique is presented for dynamically modifying class lineage in order to insert a function, such as a trace function, into an existing application executable of an object-oriented computer system. When implemented as a trace function, the technique allows a user tracing the execution of code to identify what methods of a designated class have been run and provides snapshots of the object as it is modified throughout the execution. Since the check is done at class creation time, i.e., runtime, there is no checking done at object creation time. Therefore, if a user is creating multiple objects of a single class and trace is not active, there is no tracing overhead associated with the creation of the object, and there is no overhead associated with the execution of methods in those objects. Likewise, if tracing is only implemented for a few classes, then tracing overhead is only associated with those designated classes.

Since determination is made at execution time and not compile time, the user enjoys the benefits of tracing without requiring modification to the code when tracing is needed and suffers none of the performance overhead when tracing is not needed. Since the code dynamically creates the entry and exit data needed, there is no chance for the user to inject errors when tracing. Further, since the solution enhances (in one embodiment) IBM's System Object Model's (SOM's) traditional strengths, the code is highly extendable and has binary compatibility between releases. The technique is applicable to any user providing object services wishing to inject a function at execution time without effecting performance when the function is unwanted. For example, a user of SOM or CORBA (Common Object Request Broker Architecture) object request brokers or a C++ language environment may employ the invention.

BRIEF DESCRIPTION OF THE DRAWINGS

The above-described objects, advantages and features of the present invention, as well as others, will be more readily understood from the following detailed description of certain preferred embodiments of the invention, when considered in conjunction with the accompanying drawings in which.

BEST MODE FOR CARRYING OUT THE INVENTION

In accordance with the principles of the present invention, a runtime approach for dynamically inserting a function into an existing application executable of an object-oriented computer system is provided. To understand how the solution of the present invention is implemented, the object-oriented environment itself is initially discussed.

The Common Object Request Broker Architecture (CORBA) is an accepted standard within the object-oriented computing environment. (CORBA is a Registered Trademark of the Object Management Group, Inc.) Examples of CORBA implementations are System Object Model (SOM) and Distributed System Object Model (DSOM) offered by International Business Machines Corporation. (SOM and DSOM are Trademarks of International Business Machines Corporation.) International Business Machines Corporation also offers a SOMObjects tool kit that uses SOM as its underlying technology and provides, for example, a framework for developing distributed object-oriented applications. The tool kit is described in, for example, "AIX Version 4.1 Somobjects Base Tool Kit User's Guide," International Business Machines Corporation, Publication Number SC23-2680-01, 1994; "AIX Version 4.1 Somobjects Base Tool Kit Programmer's Reference Manual," International Business Machines Corporation, Publication Number SC23-2681-01, 1994; and "CORBA—A Guide to Common Object Request Broker Architecture," by Ron Ben-Natan, MacGraw-Hill 1995, all of which are hereby incorporated herein by reference in their entireties. Additionally, CORBA, SOM, and DSOM are further described in detail in "CORBA—A Guide to Common Object Request Broker Architecture," by Ron Ben-Natan, MacGraw-Hill 1995, "Object-Oriented Programming Using SOM and DSOM," by Christina Lau, Van Norstrand Reinhold 1994, and "SOM Objects: Management Utilities for a Distributed SOM," International Business Machines Corporation, Publication Number GG24-4479-00 (April 1995), all of which are hereby incorporated herein in their entireties.

Although principally described hereinbelow with reference to SOM, those of ordinary skill in the art will understand that the concepts presented are applicable to many different types of object-oriented environments wherein dynamic insertion of a function at runtime is desirable.

In SOM, an object is an instance of a class which has, either directly or indirectly, SOMObject as its parent. SOMObject is the base class for object creation. It has the base runtime components needed to make an object viable. For example, reference FIG. 2 wherein a class called "dog" is created and has an object of that class "max". Notice in the diagram that "max" is an instance (also known as an object of) the class "dog". The class "dog" has a parent class SOMObject. A class can have many ancestors as long as SOMObject is the base of the hierarchy.

Figure 2:
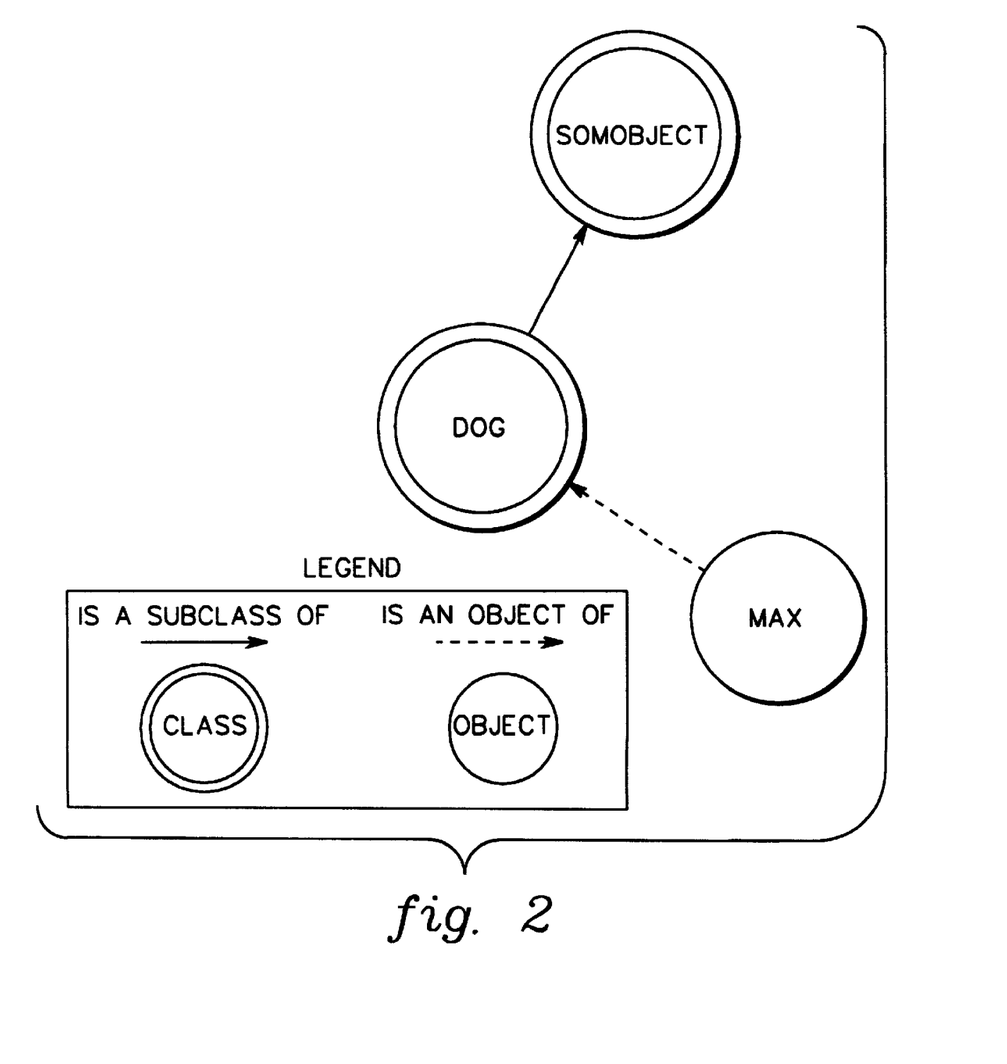
FIG. 2 is a diagram of a sample SOM hierarchy useful in explaining the object-oriented environment of the present invention.

In SOM, a class defines how an object is implemented. Objects are instances of classes. In the example of FIG. 2, "max" is an instance of the class "dog". Attributes of the object can be modified by issuing method calls to change values of that object. In the "dog" example, the attributes "breed" or "age" may be modified by issuing method calls to change these values.

Unlike C++ or other object-oriented languages, SOM defines these classes as runtime objects that are children (either directly or indirectly) of another class called "SOM-Class". It is this extra step that makes SOM powerful by allowing a user to modify the class dynamically at runtime. This provides an ability to modify a class the same way an object is modified. These class objects are instances of a class called a "meta-class". These meta-class objects allow a programmer to create methods and variables that will affect all instances of a class. One such meta-class is called a "before-after" meta-class. This meta-class allows a programmer to override the execution of each method forcing a set of instructions to happen before and after each method is executed.

In the "dog" example of FIG. 2, suppose methods for tricks are provided. Methods called "sit", "rollover", "speak", etc. would allow the "dog" object to perform tricks. Further suppose that it is desired to ensure the "dog" object only does these tricks upon command. Rather than modifying every one of these methods with a routine that checks to see if the command has been spoken, a "before" meta-class routine can be created for the "dog" class that checks the substance of a received command. Similarly, an "after" meta-class routine could be employed to issue a treat upon the exit of every method in the class.

With the introduction of the before-after meta-class, SOM allows a programmer to modify the execution of all the methods of a particular class without having to recode each method. In one embodiment, the present invention builds upon this before-after meta-class capability to create a viable dynamic trace solution. Note that although described herein with reference to tracing, the dynamic approach presented can be extended to implement any one of a number of various functions.

Before discussing the invention in greater detail, the hardware environment and the existing approach using a tracing meta-class are discussed.

Figure 3:
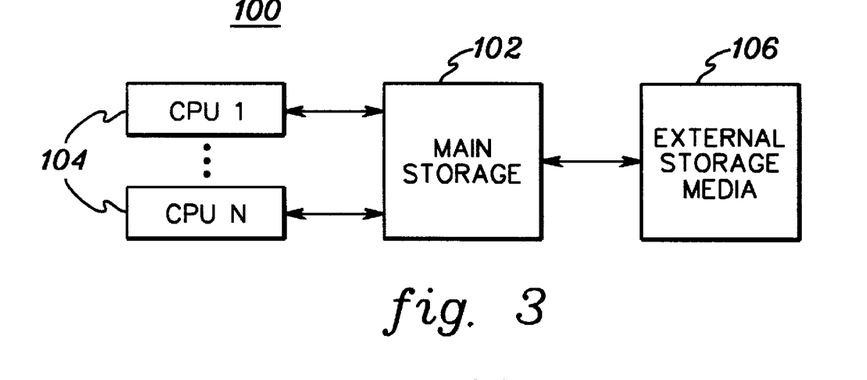
FIG. 3 depicts an example of a computer system incorporating and using the dynamic function insertion capabilities of the present invention.

In one embodiment, the dynamic runtime mechanism of the present invention is incorporated and used in a computer system 100 shown in FIG. 3. Computer system 100 may, for example, be designed following the Enterprise System's Architecture (ESA)/390 offered by International Business Machines Corporation (e.g., an ES/9000 Model 982). Enterprise System's Architecture/390 is described in detail in "Enterprise System's Architecture/390 Principles of Operation," Publication Number SA22-7201-02, Third Edition (February 1995), which is offered by International Business Machines Corporation. (ESA/390 is a Trademark of International Business Machines Corporation.)

As shown in FIG. 3, computer system 100 includes, for example, a main storage 102, one or more central processing units (CPUs) 104 and one or more external storage media 106. Each of these components is discussed below.

Central processing units 104 contain the sequencing and processing facilities for instruction execution, interruption action, timing functions, initial program loading and other machine-related functions. In one embodiment, one or more of central processing units 104 executes an operating system, such as, for example, the multiple virtual storage (MVS)/ESA operating system, offered by International Business Machines Corporation. (MVS/ESA is a Trademark of International Business Machines Corporation.) As is known, MVS/ESA controls the execution of programs running within the system and the processing of data.

Central processing units 104 are coupled via, for example, one or more bi-directional buses to main storage 102. Main storage 102 is directly addressable and provides for high-speed processing of data by the central processing units. Main storage 102 can be physically integrated with the CPUs or constructed as stand-alone units.

Main storage 102 is further coupled via, for instance, a channel to external storage media 106. External storage media 106 may include, for instance, direct access storage devices (DASD), magnetic tapes, diskettes, and/or optical devices, to name a few. Both main storage 102 and external storage media 106 are computer usable media that may store computer program products as computer readable program code. In other embodiments, computer system 100 may include a mainframe computer system executing a Virtual Machine (VM) Operating System offered by International Business Machines Corporation, an Intel Processor-based personal computer executing an IBM OS/2 Warp Operating System, an Intel Processor-based personal computer executing a Microsoft Windows 95 Operating System, or a Power PC-based computer executing a UNIX Operating System, to name a few.

Figure 4:
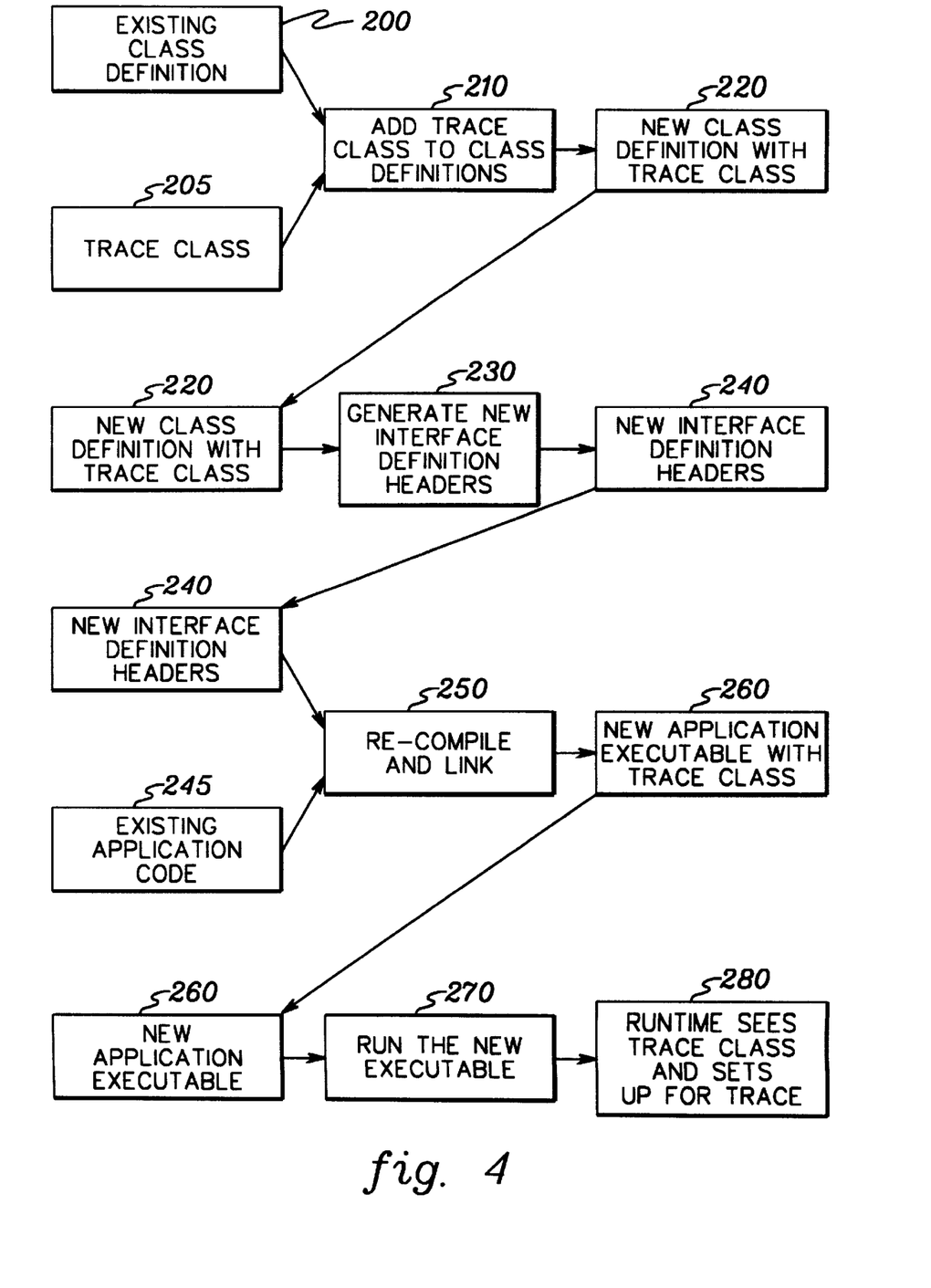
FIG. 4 is a flowchart of one embodiment of an existing approach for performing entry/exit tracing using a trace meta-class.

FIG. 4 presents an overview of the conventional approach for implementing tracing employing a before-after meta-class in SOM. As shown, an existing class definition 200 is combined with a trace class 205 to create a new class definition 210. This new class definition incorporating the trace class 220 is then used to generate new language bindings such as interface definition headers 230. These new language bindings are obtained by running the revised interface definition 220 through, for example, an IDL compiler or SOM compiler. The new interface definition headers 240 are then employed in combination with an existing application code 245 in recompiling and linking the code 250 to produce a new application executable 260. This new application executable is then used at runtime 270, and runtime will see the trace class in the new executable and setup for the desired trace function 280.

Note that the approach outlined in FIG. 4 is an improvement over the conventional approach of hard coding trace invocations within the target methods themselves, however, the approach still requires turning tracing on and off via compiled code changes, and therefore programmer involvement. This may not be acceptable in certain cases, for example, where the code involved is product code in use at a customer location. The customer cannot be expected to rebuild the product code to turn on tracing for use in problem diagnosis. Thus, a dynamic runtime approach to implementing tracing is still needed.

Figure 5:
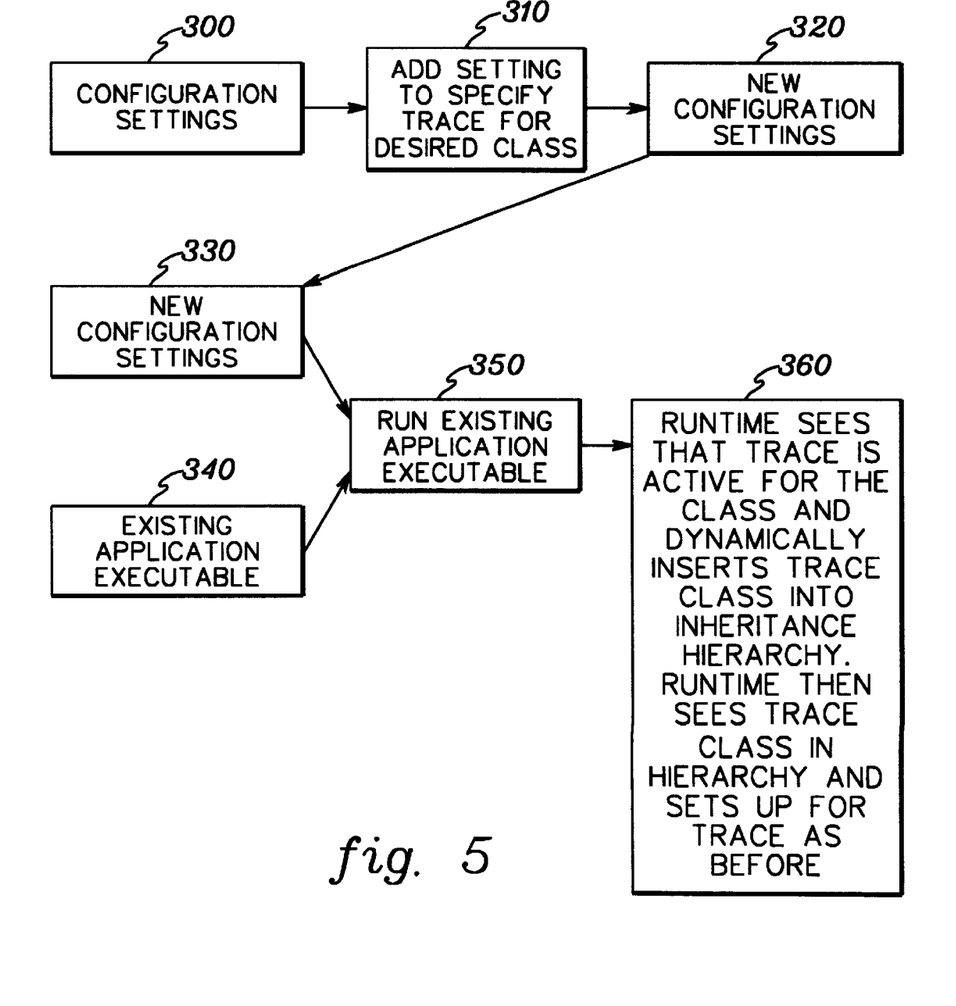
FIG. 5 is a flowchart of one embodiment for performing dynamic function insertion in accordance with the present invention.

FIG. 5 depicts one embodiment of an approach for dynamically modifying class lineage when classes are created in accordance with the present invention. Specifically, configuration settings 300 received as part of a program's execution code are modified at runtime to add a setting to specify (as one example) tracing for a desired class of the executable 310, thereby producing new configuration settings 320.

As used herein, the phrase "configuration settings" is used interchangeably with trace settings and trace configuration settings. By way of example, the configuration settings may comprise environment variables which include named value pairs that define parameters for t he execution environment. Configuration settings are considered in the art to be within a "configuration file".

Continuing with FIG. 5, the new configuration settings 330 are then employed with the existing application executable 340 to run the application executable 350. The object runtime will query the configuration settings and when a trace is active for a given class, will dynamically insert the trace class into the inheritance hierarchy for that class, i.e., in an SOM implementation. Runtime will then see the trace class within the hierarchy and setup for a trace 360.

Note that by using the approach of FIG. 5, a user need only update the runtime's configuration settings and run the application. Upon seeing a configuration setting that indicates that methods of a particular class should be traced, the runtime will dynamically insert the tracing class into the inheritance hierarchy of that class. Following this, the redirection stub is employed. Thus, the approach allows a class to be traced on demand with out requiring code changes. The user can dynamically identify a set of classes to be traced and redirection stubs will be employed to cut entry/exit trace records around each target method. If no tracing is specified, then no redirection occurs and conditional logic overhead is avoided. Therefore, the approach is ideal for existing product code.

The following is an example of the configuration settings used to set up a desired tracing environment. A configuration variable is initialized with the name(s) of the class(es) whose methods should be traced:

[TraceOptions]

ClassTrace=Class1, Class2, Class3, Class4

The above ClassTrace configuration variable can be either in an options file or in an environment variable. TraceOptions identifies a stanza which is used to qualify configuration variable names. The language runtime contains a function that can be used to read the configuration variable. For example, in SOM the following could be used to obtain the value of the ClassTrace variable:

Value=somutgetenv("TraceOptions", "ClassTrace");

Following the invocation of somutgetenv, Value would contain the string of classes to be traced. The "somutgetenv" is a function in SOM and is a standard mechanism for retrieving variables. The "getenv" is another function which could be used to accomplish this.

Figure 6:
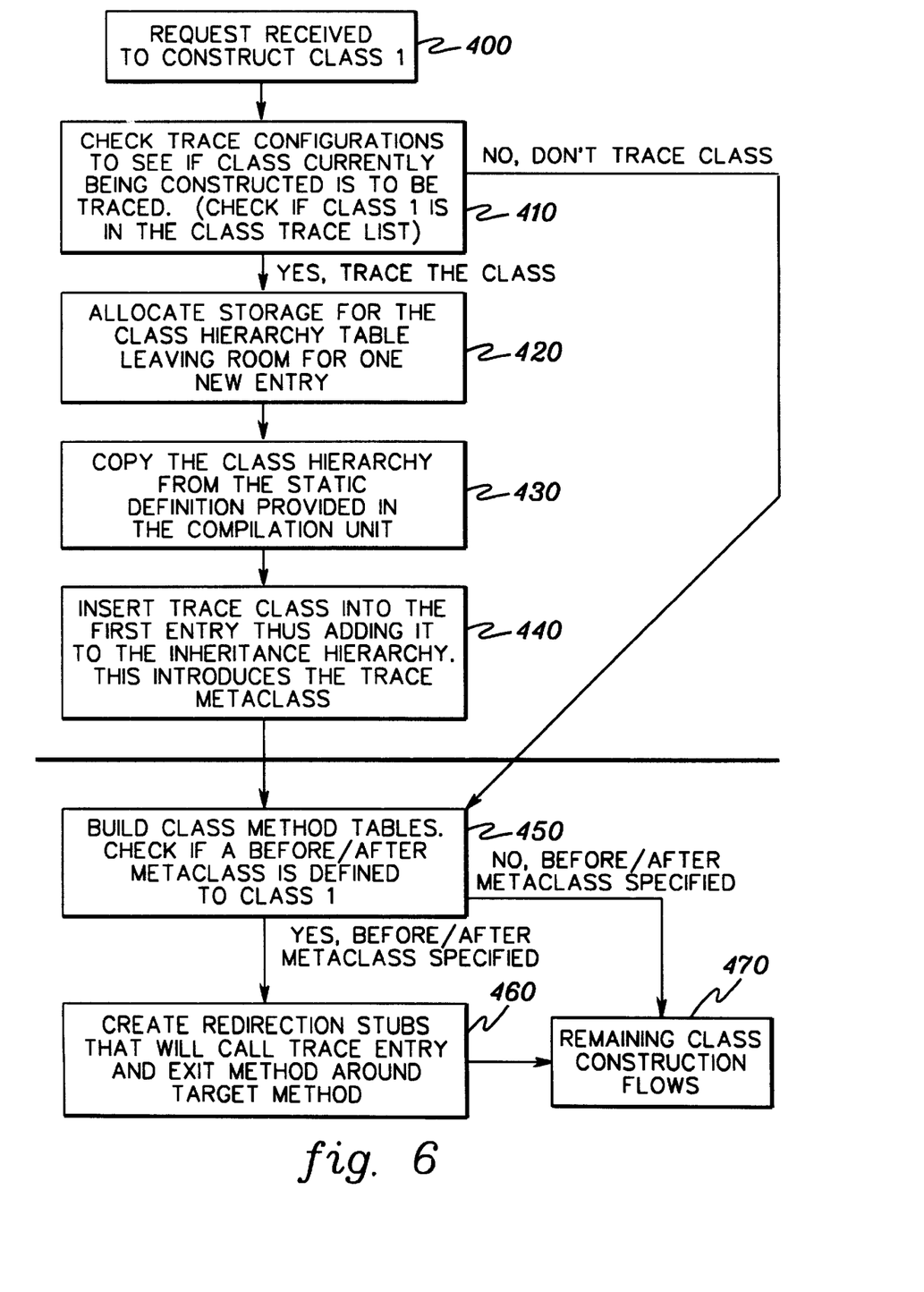
FIG. 6 is a flowchart of one embodiment of an approach for modifying class construction flow in accordance with the present invention.

FIG. 6 presents one SOM embodiment of processing in accordance with the present invention for dynamically inserting a trace class into an inheritance hierarchy at runtime during class construction. This example assumes that the executable code requests that a class 1 be constructed 400. Initially, the configuration settings are checked to determine whether the class currently being constructed is to be traced, i.e., is class 1 in a Class Trace list defined by the user 410. If "yes", the class is to be traced, and tracing is begun by allocating storage for a new class hierarchy table leaving room for one new entry 420. The static class hierarchy is then copied from the definition provided in the compilation unit of the system into this new class hierarchy table 430, after which the trace class is inserted into one of the entries in this new class hierarchy table, thus adding it to the inheritance hierarchy for the class being constructed 440. This insertion of the trace class into the table introduces the trace meta-class. The remaining processing of FIG. 6 builds the class method tables and checks to determine whether the before/after meta-class is defined to the given class (i.e., class 1) 450. If "yes", then redirection stubs are created that will trace entry and exit methods around each target method within class 1. Otherwise, no before/after meta-class is specified and processing proceeds to the remaining, conventional class construction flow 470.

In the above example, the class hierarchy table for class 1 may look like Table 1.

TABLE 1

ClassA
ClassB
ClassC
ClassD

The goal of the processing outlined in FIG. 6 is to add a trace class to the inheritance hierarchy of, for example, this class 1. The trace class has as its meta-class the tracing meta-class which is built upon the before/after meta-class. After the trace class is added to the hierarchy, the class hierarchy table will resemble Table 2.

TABLE 2

ClassA
ClassB
ClassC
ClassD
Trace Class

The result of adding the trace class to the hierarchy is to cause the latter part of class construction process to insert the redirection stubs that will cause tracing to be performed. The normal class method table may look like Table 3.

TABLE 3

Method1 address
Method2 address
Method3 address
Method4 address

An example of the class method table with redirection employed might be as presented in Table 4.

TABLE 4

Redirection Stub 1 address
Redirection Stub 2 address
Redirection Stub 3 address
Redirection Stub 4 address The redirection stubs will invoke the before routine, then invoke the target method, and then invoke the after routine.

Figure 7:
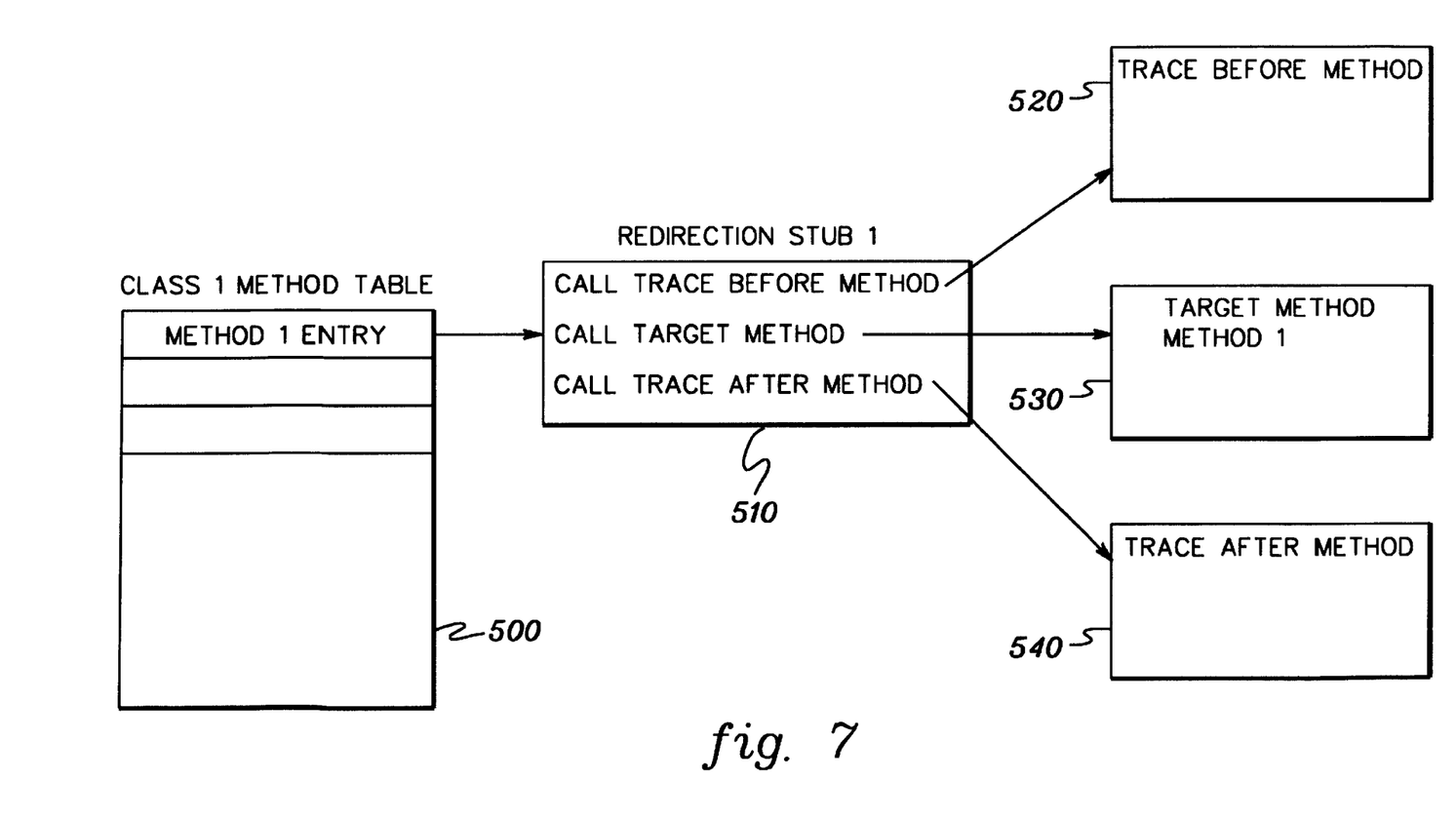
FIG. 7 is an example of one embodiment of processing employing redirection stubs in implementing the dynamic insertion of a trace function into an existing application executable in accordance with the present invention.

FIG. 7 depicts an example of a redirection stub wherein the class 1 method table 500 includes a method 1 entry. The redirection stub 1 510 itself comprises a call to the trace routine before the target method 1 520, a call to the target method 530, and then a call to the trace routine after the target method 540.

Given the arrangement of FIG. 7, when a program invokes method 1, it will not be invoked directly. Rather, the redirection stub is inserted before method 1, and is inclusive of method 1. In the tracing example, the redirection stub will perform the tracing functions before and after the call to method 1.

Figure 8:
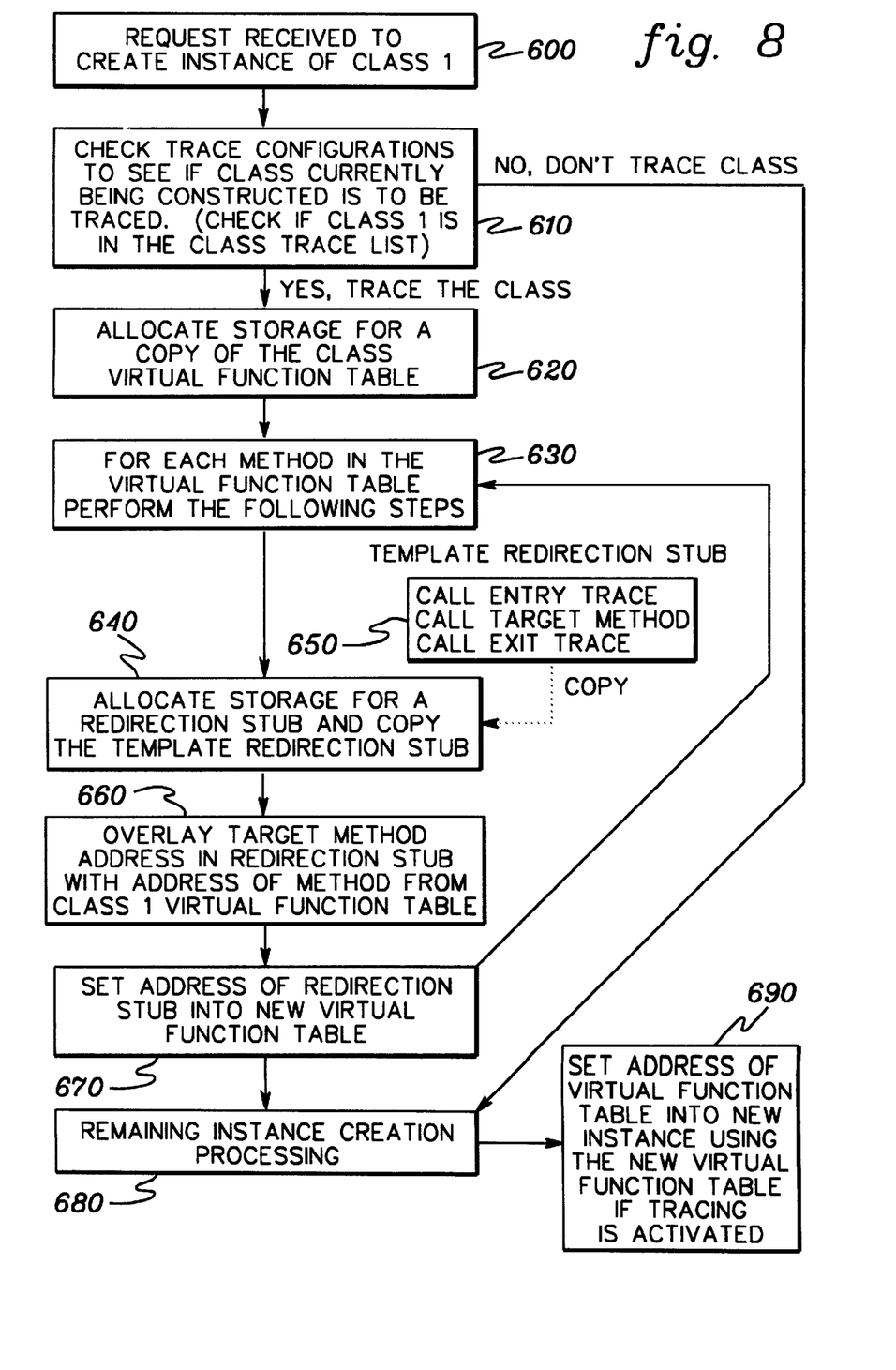
FIG. 8 is a flowchart of an alternate embodiment for inserting a trace function into an existing application executable in accordance with the present invention.

While the specific approach presented herein inserts a trace class into the inheritance hierarchy, which in turn causes specific redirection capabilities to be employed, one skilled in the art can readily imagine more general approaches. For example, one alternate approach, which would be applicable to C++ language, is depicted in FIG. 8. In this embodiment, a request is received to create an instance of a class, for example, class 1 600. Since classes are static in C++, there is no class construction process per se, but rather instances of a class are constructed.

Processing initially checks the configuration settings to determine whether the class of the instance currently being constructed is to be traced, i.e., processing determines whether class 1 is in a Class Trace list 610. If "yes", then storage is allocated for a copy of the class' virtual function table. A virtual function table in C++ is analogous to a method table in SOM. For information regarding creation of virtual function tables, reference an article by C. Skelly, entitled "Powerful Pointers to Member Functions (New Pointer Types in C++)" C/C++ User's Journal, N.10, V.12, p. 51(9) (October 1994). After allocating table storage, then for each method in the virtual function table 630 storage is allocated for a redirection stub and a copy of the template of the redirection stub is made 640. The template redirection stub 650 includes a call to an entry trace, a call to the target method, and then a call to an exit trace.

Next, the target method address is overlaid within the redirection stub with the address of the subject method from the class 1 virtual function table 660. The address of the redirection stub is then set into the new virtual storage table 670 and the process repeats for the next method of class 1. Once all methods have been overlaid onto redirection stubs, processing continues with the remaining, conventional instance creation 680. Note that if class 1 is not within the Class Trace list, then from instruction 610, processing skips the new virtual function table creation and the redirection stub processing of instructions 620–670. Finally, if tracing is activated, then the address of the virtual function table is set into the new instance using the new virtual function table 690. Otherwise, if no tracing is activated, then the address of the virtual function table is set into the new instance using the original virtual function table address.

Note that in FIG. 8, the activation of tracing causes the redirection stubs to be created for each method of the class to be traced. The redirection stub is based on a template redirection stub that has been hard coded to call the entry and exit traces around each target method of a class to be traced. When the hard coded redirection stub is copied, the address of the target method need only be replaced with the address obtained from the static virtual function table of class 1.

FIG. 8 also shows that the redirection in accordance with the present invention takes place at the time and object instance is created, i.e., at runtime. It should be possible to perform this redirection so that it only needs to be performed once. For example, the language runtime could remember that the new virtual function table has been created and automatically use that new virtual function table upon the creation of the new instance of that class.

Later, when the target method is invoked on an instance of the class, the redirection stub will cause the tracing to be performed. If tracing is not to be done, no redirection stub is inserted and performance remains optimal. Also, note that redirection stubs could be employed in the process of FIG. 7, which achieves the same result as using meta-classes, only through a more general technique.

While the discussion presented herein has been based upon an application that involves tracing, those skilled in the art will recognize that the concepts disclosed (including the use of redirection stubs) could be employed for other purposes. For example, this approach could be used to dynamically insert security checks for a target method. A redirection stub could be created that calls a security service such as that provided in IBM's Resource Access & Control Facility (RACF). When no security is desired, the application would run without incurring overhead of the security call.

Those skilled in the art will note that the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as part of a computer system or sold separately.

The flow diagrams depicted herein are exemplary. There may be other variations to these diagrams or the steps (or operations described herein) without departing from the spirit of the invention. For instance, the steps may be performed in differing order, or steps may be added, deleted, or modified. All these variations are considered a part of the claimed invention.

Although preferred embodiments have been depicted and described in detail herein, it will be apparent to those skilled in the art that various modifications, additions, substitutions and the like can be made without departing from the spirit of the invention and these are therefore considered to be within the scope of the invention as defined in the following claims.

What is claimed is:

1. A method for inserting a function into an application executable of an object-oriented computer system without recompiling said application executable, said method comprising:

modifying runtime configuration settings for said application executable to add a setting to specify said function for at least one class of said application executable; and running said application executable using said modified runtime configuration settings and if runtime determines that said function is active for a class of said application executable using said modified runtime configuration settings, then dynamically creating a redirection stub to implement said function for said class.

2. The method of claim 1, wherein said class comprises a target method and said redirection stub comprises calling at least one of an entry function and an exit function for said target method.

3. The method of claim 1, wherein said function comprises a trace function, and said redirection stub comprises calling at least one of an entry trace function and an exit trace function for each method of said class for which said function is active.

4. The method of claim 1, wherein said method further comprises dynamically inserting said function into an inheritance hierarchy for said class if runtime determines that said function is active for said class of said application executable, and employing said inheritance hierarchy in processing said class, said processing including said creating of said redirection stub.

5. The method of claim 1, wherein said object-oriented computer system comprises a CORBA implemented object-oriented computer system.

6. The method of claim 1, wherein said modifying of said runtime configuration settings comprises defining a list containing at least one class of said application executable to implement said function, and wherein said running comprises checking said list when constructing said class of said application executable to determine whether said function is active for said class.

7. The method of claim 6, wherein if said class being constructed is contained within said list, said method further comprises allocating storage for a new class hierarchy table leaving space for a copy of a static class hierarchy table of said class and an additional entry;

copying the static class hierarchy table into said new class hierarchy table;

inserting a function class into said new class hierarchy table, thus adding said function class to an inheritance hierarchy for said class; and wherein said running comprises employing said inheritance hierarchy when processing said class of said application executable.

8. The method of claim 7, wherein said running comprises for each class of said application executable, building method tables for methods of said class and for each method of said class, checking to determine whether said function class is within its inheritance hierarchy, and if so, then performing said creating of said redirection stub for said method to call at least one of an entry function and an exit function for said method.

9. The method of claim 1, wherein if runtime determines that said function is active for said class of said application executable using said modified runtime configuration settings, then said method comprises:

allocating storage for a new virtual function table for said class;

for each method within a static virtual function table associated with said class, performing:
  (i) allocating of storage for said redirection stub and copying a template redirection stub into said allocated storage;
  (ii) overlying said redirection stub with an address of said method from the static virtual function table; and
  (iii) setting an address of the redirection stub into the new virtual function table, wherein said new virtual function table is employed when processing said class of said application executable.

10. An object-oriented computer system for inserting a function into an application executable without recompiling said application executable, said system comprising:

means for modifying runtime configuration settings for said application executable to add a setting to specify said function for at least one class of said application executable; and means for running said application executable using said modified runtime configuration settings, wherein said means for running comprises means for determining whether said function is active for a class of said application executable using said modified runtime configuration settings, and means for dynamically creating a redirection stub to insert said function for said class if said function is active for said class.

11. The system of claim 10, wherein said class comprises a target method and said redirection stub comprises means for calling at least one of an entry function and an exit function for said target method.

12. The system of claim 10, wherein said function comprises a trace function, and said redirection stub comprises means for calling at least one of an entry trace function and an exit trace function for each method of said class for which said function is active.

13. The system of claim 10, wherein said system further comprises means for dynamically inserting said function into an inheritance hierarchy for said class if said means for running determines that said function is active for said class of said application executable, and means for employing said inheritance hierarchy in processing said class, said means for employing including said means for creating said redirection stub.

14. The system of claim 10, wherein said object-oriented computer system comprises a CORBA implemented object-oriented computer system.

15. The system of claim 10, wherein said means for modifying runtime configuration settings comprises means for defining a list containing at least one class of said application executable to implement said function, and wherein said means for running comprises means for checking said list when constructing said class of said application executable to determine whether said function is active for said class.

16. The system of claim 15, wherein if said class being constructed is contained within said list, said system further comprises:

means for allocating storage for a new class hierarchy table leaving space for a copy of a static class hierarchy table associated with said class and an additional entry;

means for copying the static class hierarchy table into the new class hierarchy table;

means for inserting a function class into said new class hierarchy table, thus adding said function class to an inheritance hierarchy for said class; and wherein said means for running comprises means for employing said inheritance hierarchy when processing said class of said application executable.

17. The system of claim 16, wherein said means for running comprises for each class of said application executable, means for building method tables for methods of said class, and for each method of said class, means for checking to determine whether said function class is within its inheritance hierarchy, and if so, said means for creating comprises means for creating said redirection stub for said method to call at least one of entry function and an exit function for said method.

18. The system of claim 10, wherein if said means for running determines that said function is active for said class of said application executable using said modified runtime configuration settings, then said system further comprises:

means for allocating storage to a new virtual function table for said class;

for each method within a static virtual function table associated with said class, means for performing:
  (i) allocating of storage for said redirection stub and copying a template redirection stub into said allocated storage;
  (ii) overlying said redirection stub with an address of said method from the static virtual function table; and
  (iii) setting an address of the redirection stub into the new virtual function table, wherein said new virtual function table is employed when processing said class of said application executable.

19. An object-oriented computer system for inserting a function into an application executable without recompiling said application executable, said system comprising:

a computing unit adapted to modify runtime configuration settings for said application executable to add a setting to specify said function for at least one class of said application executable; and said computing unit being further adapted to run said application executable using said modified runtime configuration settings and if runtime determines that said function is active for a class of said application executable using said modified runtime configuration settings, then to dynamically create a redirection stub to implement said function for said class.

20. An article of manufacture comprising:
at least one computer usable medium having computer readable program code means embodied therein for causing inserting of a function into an application executable of an object-oriented computer system without recompiling the application executable, the computer readable program code means in said article of manufacture comprising:
- (i) computer readable program code means for causing a computer to effect modifying runtime configuration settings to add a setting to specify said function for at least one class of said application executable; and
- (ii) computer readable program code means for causing a computer to effect running said application executable using said modified runtime configuration settings and if runtime determines that said function is active for a class of said application executable using said modified runtime configuration settings, then to effect dynamically creating a redirection stub to implement said function for said class.

21. The article of manufacture of claim 20, wherein said class comprises a target method and said redirection stub comprises computer readable program code means for causing a computer to effect calling at least one of an entry function and an exit function for said target method.

22. The article of manufacture of claim 20, wherein said function comprises a trace function, and said redirection stub comprises computer readable program code means for causing a computer to effect calling at least one of an entry trace function and an exit trace function for each method of said class for which said function is active.

23. The article of manufacture of claim 20, further comprising computer readable program code means for causing a computer to effect dynamically inserting said function into an inheritance hierarchy for said class if runtime determines that said function is active for said class of the application executable, and computer readable program code means for causing a computer to effect employing said inheritance hierarchy in processing said class, said processing including said creating of said redirection stub.

24. The article of manufacture of claim 20, wherein said object-oriented computer system comprises a CORBA implemented object-oriented computer system.

25. The article of manufacture of claim 21, wherein said computer readable program code means for causing a computer to effect modifying comprises computer readable program code means for causing a computer to effect defining a list containing at least one class of said application executable to implement said function, and wherein said computer readable program code means for causing a computer to effect running comprises computer readable program code means for causing a computer to effect checking said list when constructing said class of said application executable to determine whether said function is active for said class.

26. The article of manufacture of claim 25, wherein if said class being constructed is contained within said list, said article of manufacture further comprises:
computer readable program code means for causing a computer to effect allocating storage for a new class hierarchy table leaving space for a copy of a static class hierarchy table of said class and an additional entry;
computer readable program code means for causing a computer to effect copying the static class hierarchy table into the new class hierarchy table of said allocated storage;
computer readable program code means for causing a computer to effect inserting a function class into said new class hierarchy table, thus adding said function class to an inheritance hierarchy for said class; and
wherein said computer readable program code means for causing a computer to effect running comprises computer readable program code means for causing a computer to effect employing said inheritance hierarchy when processing said class of said application executable.

27. The article of manufacture of claim 26, wherein said computer readable program code means for causing a computer to effect running comprises for each class of said application executable, computer readable program code means for causing a computer to effect building method tables for methods of said class, and for each method of said class, computer readable program code means for causing a computer to effect checking to determine whether said function class is within its inheritance hierarchy, and if so, then for performing said creating of said redirection stub for said method to call at least one of an entry function and an exit function for said method.

28. The article of manufacture of claim 20, wherein if runtime determines said function is active for said class of said application executable using said modified runtime configuration settings, then said article of manufacture further comprises:
computer readable program code means for causing a computer to effect allocating storage for a new virtual function table for said class;
computer readable program code means for causing a computer to effect performing for each method within a static virtual function table:
- (i) allocating of storage for said redirection stub and copying a template redirection stub into said allocated storage;
- (ii) overlying said redirection stub in storage with an address of said method from said static virtual function table; and
- (iii) setting an address of the redirection stub into the new virtual function table, wherein said new virtual function table is employed when processing said class of said application executable.

\* \* \* \* \*